INVENTOR.
Leonard J. Mann
BY Edwin S. Dybvig
His Attorney

Nov. 17, 1959   L. J. MANN   2,912,834
REFRIGERATING APPARATUS
Filed Jan. 8, 1957   3 Sheets-Sheet 3

INVENTOR.
Leonard J. Mann
BY
Edwin S. Dybvig
His Attorney

2,912,834
Patented Nov. 17, 1959

2,912,834

REFRIGERATING APPARATUS

Leonard J. Mann, Dayton, Ohio, assignor to General Motors Corporation, Detroit, Mich., a corporation of Delaware Application January 8, 1957, Serial No. 633,109

8 Claims. (Cl. 62—276)

This invention relates to refrigerating apparatus and more particularly to household refrigerators of the two compartment type.

This application is a continuation-in-part of Serial No. 527,290, filed August 9, 1955, which issued on May 21, 1957, as Patent 2,792,691.

Household refrigerators are required to conveniently and economically provide a wide variety of refrigeration such as rapid freezing, frozen storage at about zero degrees F., the keeping at above freezing food preserving temperatures vegetables and fruits in the open and food and drink in closed containers for long periods of time without deterioration or loss of flavor or spoilage.

It is an object of this invention to provide a household refrigerator in which a single two evaporator refrigerating system accomplishes these functions without objectionable accumulation of frost.

It is another object of this invention to provide a household refrigerator with a frost free rapid freezing compartment and a food compartment kept at proper temperatures by a separate evaporator in the same refrigerating system.

These and other objects are obtained in the form of the invention shown in the drawings in which an insulated household refrigerator cabinet is provided with box-shaped food and freezing compartment liners located one above the other. The freezing compartment liner is provided with a bottom drain pan upon which rests the freezing compartment evaporator which in turn supports a false bottom serving as the rapid freezing surface. A collar is provided around the front portion of the freezing compartment which receives air through apertures in the walls and conducts the air to the front end of the vertical finned evaporator. The rear of the false bottom is provided with a shroud for conducting air from the rear of the evaporator to a fan. This fan directs the air through a shroud on the back wall to air discharge openings in the rear wall of this liner. The air is dried sufficiently before it reaches these discharge apertures that it will not cause formation of frost within the freezing compartment liner.

The food compartment liner is provided with a false rear wall behind which is a vertical plate type evaporator connected to the outlet of the freezing evaporator. A fan is provided beneath the food compartment evaporator for drawing air from the food compartment and discharging it upwardly in the passage behind the false wall on both sides of the plate evaporator to a discharge device which spreads the cooled air evenly in its discharge into the upper portion of the food compartment. The refrigeration system is controlled by the air temperature adjacent the discharge device to keep the food compartment at the proper temperature. The freezing evaporator is of sufficient size that normal operation of the system necessary to keep the desired food compartment temperature will maintain adequate freezing temperatures and provide for rapid freezing.

Further objects and advantages of the present invention will be apparent from the following description, reference being had to the accompanying drawings wherein a preferred form of the present invention is clearly shown.

Figure 1:
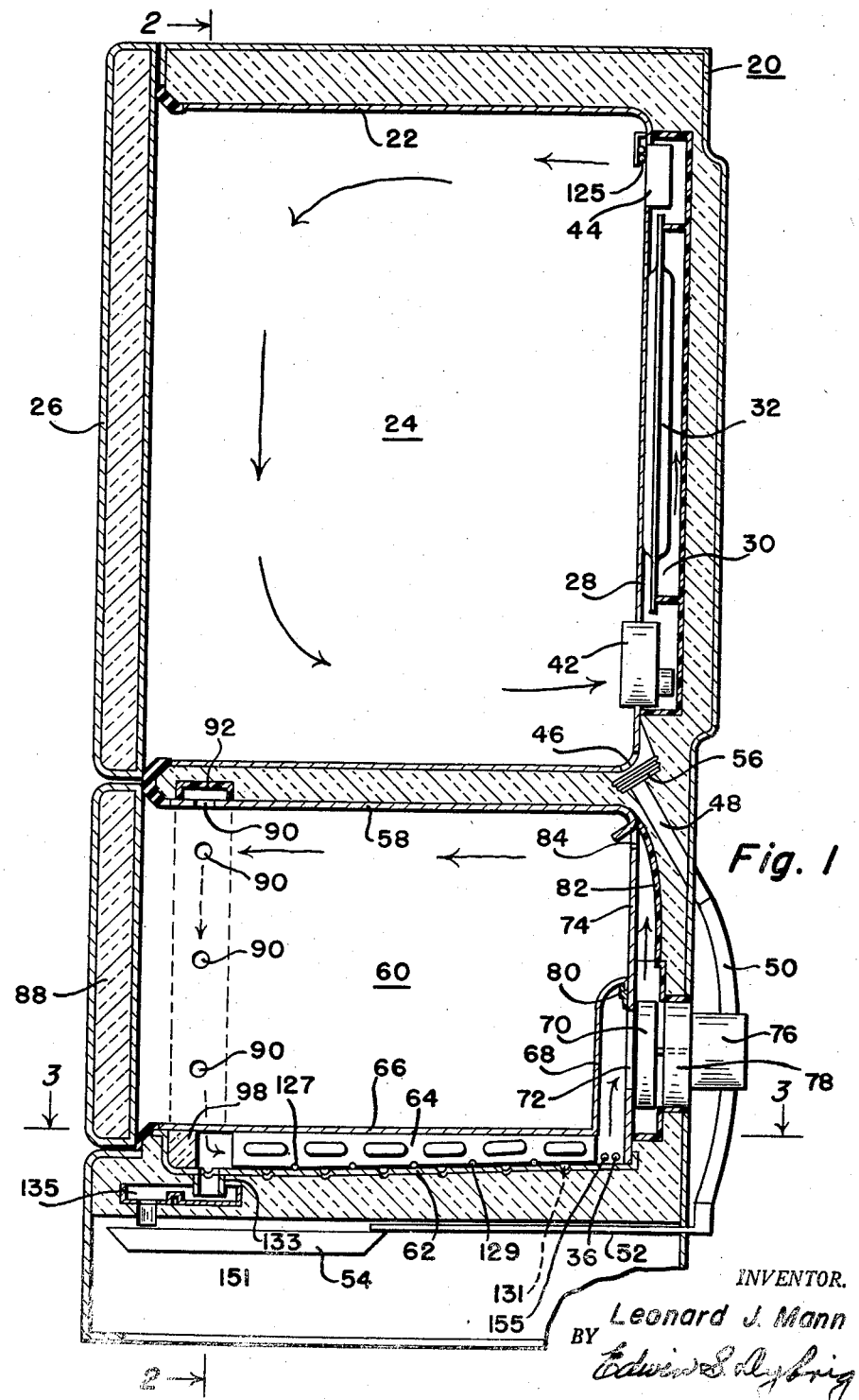
Figure 1 is a vertical sectional view of a household refrigerator embodying one form of my invention taken along the line 1—1 of Figure 2.
Figure 2:
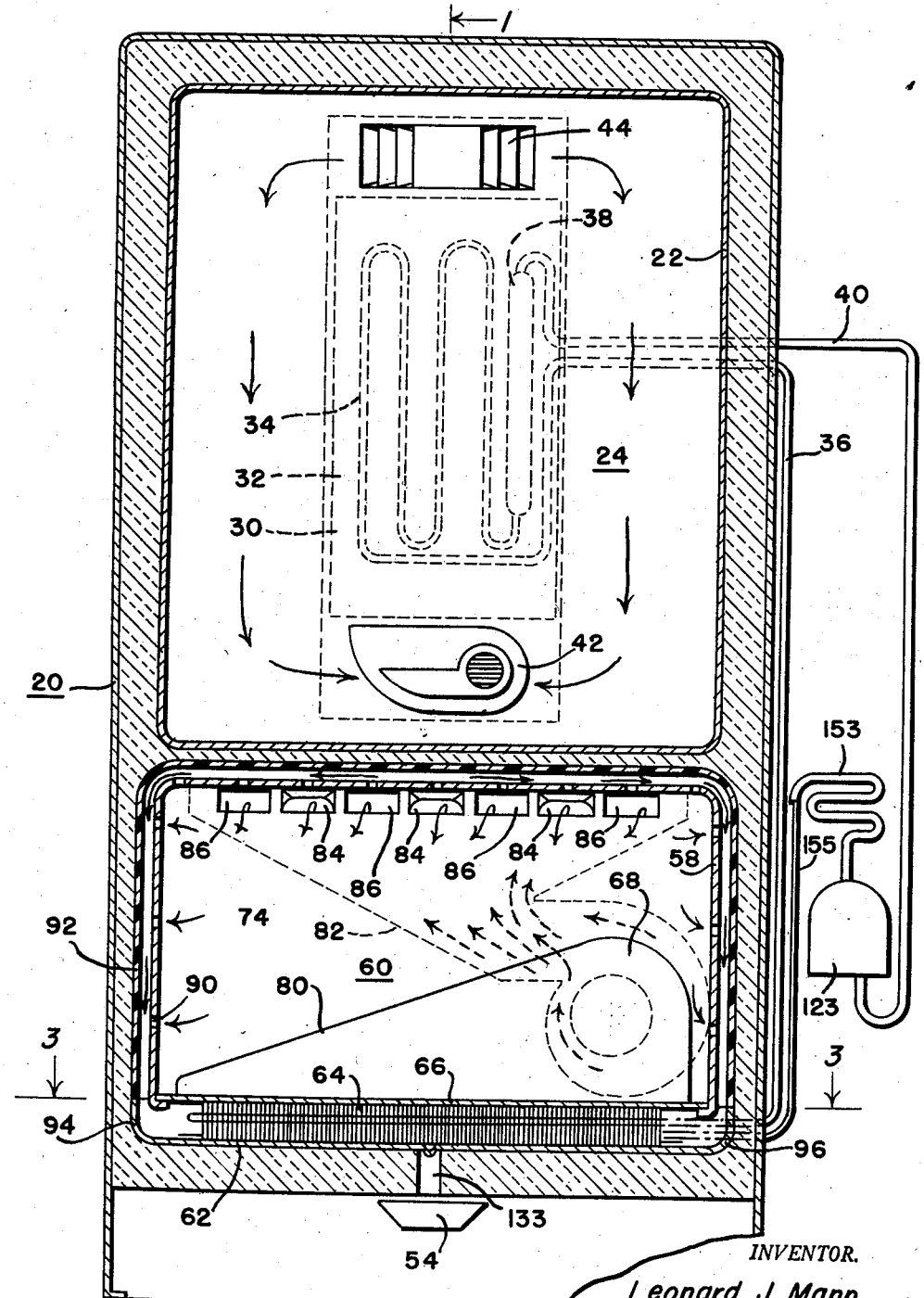
Figure 2 is a vertical sectional view taken along the line 2—2 of Figure 1.

Referring now to the drawings and more particularly to Figures 1 and 2 there is shown an insulated household refrigerator cabinet 20 containing in its upper portion a box-shaped metal liner 22 enclosing the above freezing food storage compartment 24. This compartment 24 is closed by a separate insulated door 26. This food compartment is provided with a false rear wall 28 behind which is a vertical air passage 30 containing the plate evaporator 32. This plate evaporator 32 includes a serpentine refrigerant conduit 34 connected to a supply conduit 36 and an enlarged header or boiler 38 in the final passage which discharges into the suction conduit 40. The bottom of the air passage 30 is provided with a small fan 42 having its inlet connected to the compartment 24 and its outlet discharging into the bottom of the passage 30. The top of the passage 30 is provided with a discharge device 44 which spreads air discharged from the top of the passage 30 into the top of the compartment 24. Since the compartment 24 is maintained above freezing temperatures no frost will form therein but frost may form on the evaporator 32. If any moisture should condense within the compartment 24 or the evaporator 32 is defrosted, this condensate or defrost water may drain through the outlet 46 connecting with a conduit 48 and a rubber hose 50 which discharges into a conduit 52 for conducting this water to an evaporating pan 54 located in the machinery compartment. The portion of the cabinet adjacent the outlet 46 may be provided with a small heater 56 to prevent any freezing of this water at that point.

Beneath the food compartment 24 is the box-shaped liner 58 enclosing the freezing compartment 60. This liner 58 includes integral top, side and rear walls together with a removable bottom wall 62 which has upwardly curled edges and serves as a drain pan. This removable bottom wall is removably fastened to the side and rear walls and supports a vertically finned evaporator 64 having its fins extending from front to rear. This evaporator 64 supports a false bottom 66 provided with an integral rear portion 68 forming an inlet shroud for the fan 70 located behind an aperture 72 in the rear wall 74. This fan is directly connected to an electric motor 76 located outside the refrigerator at the rear. In between the motor 76 and the fan 70 is a piece of insulation 78 which is removably located in the insulated rear wall of the cabinet 20. This arrangement makes it possible to readily remove the fan 70, the insulation 78 and the motor 76 as a unit for inspection or repair without difficulty. The inlet shroud 68 is provided with a downward extension received within a long notch or trough formed by a Z-shaped strip 80 fastened to the rear wall 74 by which the inlet shroud 68 is substantially sealed to the rear wall 74.

The fan 70 is surrounded by the discharge shroud 82 which covers the upper portion of the rear wall 74. The air absorbs heat from the freezing compartment 60 through the shrouds 68 and 82 and the rear wall 70 prior to its discharge through the series apertures 84 and 86 across the top of the rear wall 74. The apertures 84 are provided with downwardly directed louvers while the apertures 86 are plain. Since the air is slightly heated prior to its discharge through the apertures 84 and 86, it will not form frost within the compartment 62. In fact, the air is dry enough to sublime any frost which may occur in the compartment 26 during the time that the compartment door 88 is open. The air flowing through the freezing compartment 60 keeps all the frozen packages therein at a safe temperature at about zero degrees F. or below. This air discharges through apertures 90 in the side and top walls of the liner 58 into a hollow collar 92 of molded plastic which discharges into outwardly extending projections 94 and 96 formed on the opposite sides of the drain pan 62. The drain pan 62 is provided at its front edge with a piece of insulation 98 having forwardly curved ends which insulates the air from the front wall and guides the air into the front edge of the vertical fins of the evaporator 64.

The evaporators 64 and 32 operate at a temperature of about −10° F. The refrigerating system is controlled by the thermostatic switch 121 connected in series with the motor compressor unit 123. This switch 121 has the end portion of its thermosensitive element 125 formed into a serpentine shape and held in place by a plastic bracket provided on the discharge device 44 so that it is continually exposed to the air flow emerging from the top of the passage 30. The bottom of the fins of the freezing evaporator 64 are provided with notches 127 which receive a removable sheathed electric heater 129 extending in a serpentine path at the bottom of the evaporator 64. This heater 129 rests upon the drain pan 62 and keeps the bottom of the evaporator 64 spaced about a sixteenth or an eighth of an inch away from the drain pan 62. The drain pan 62 is provided with a system of drainage grooves 131 for collecting the melted frost from the evaporator 64 and conducting the melted frost to the outlet 133 adjacent the front of the pan 62. The bottom of the evaporator 64 and the pan 62 both slope toward the drain outlet 133. The drain outlet 133 discharges into the water trap 135 having an intermediate dam holding a sufficient amount of liquid to immerse the bottom of the outlet 133. The water trap 135 discharges into the evaporating pan 54.

Figure 3:
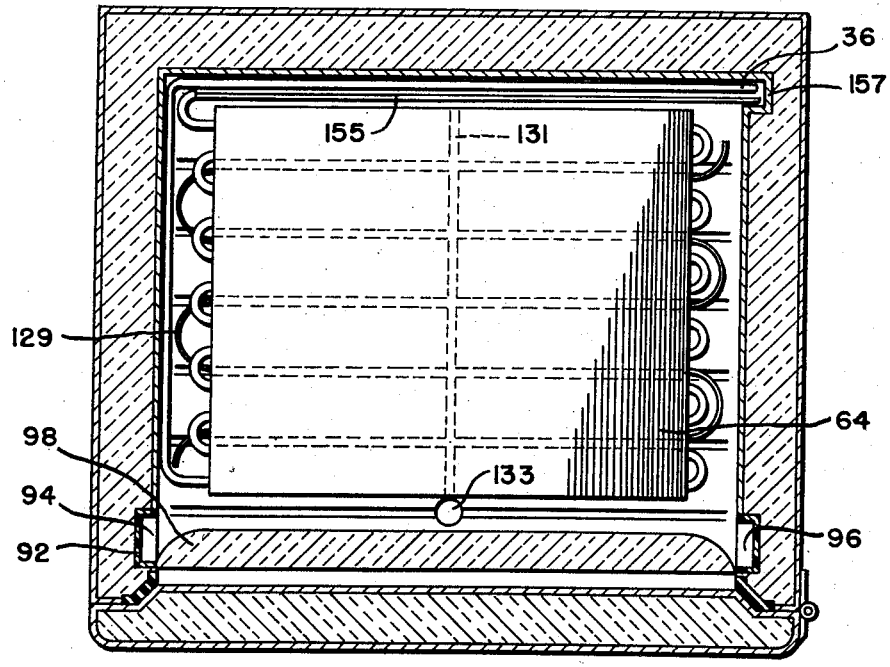
Figure 3 is a horizontal sectional view taken along the line 3—3 of Figures 1 and 2.

As shown in Figure 3, the capillary liquid supply conduit 155 extends through the extension 157 across the rear of the evaporator 64 to the inlet connection at the left rear corner. The connecting conduit 36 extends from the outlet at the left front rearwardly along the left side of the evaporator 64 and then across the back of the evaporator 64 through the projection or extension 157 to the plate evaporator 32. The arrangement allows the easy removal of the integral bottom wall 66 and the inlet shroud 68 providing access to the evaporator 64. The portion of the refrigerant supply and connecting conduits 155 and 36 across the rear of the evaporator 64 can be readily twisted in torsion without damage to make it possible to lift and pivot upwardly the front of the evaporator for access, inspection and removal of the heater 129. This also makes possible the easy cleaning of this area as well as the outlet 133.

Figure 4:
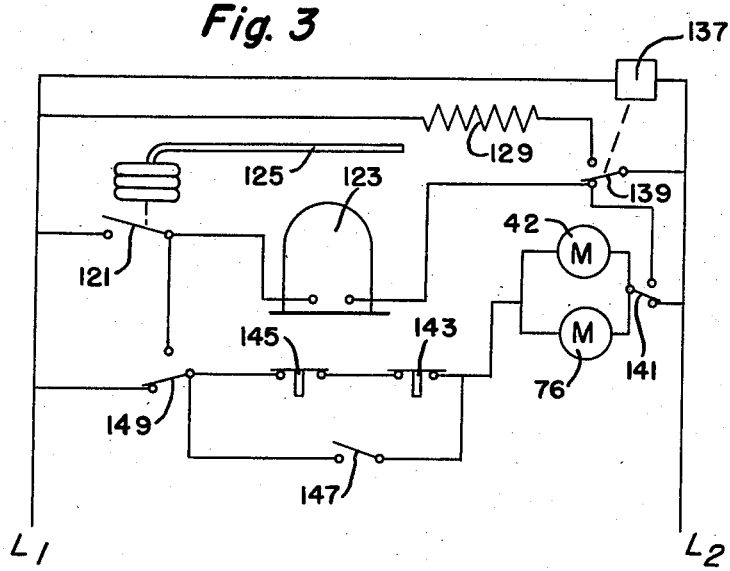
Figure 4 is a wiring diagram.

As shown in Figure 4, the defrost heater 129 is controlled by a time clock 137 which once a day moves the double throw switch 139 from its connection with the sealed motor compressor unit 123 into connection with the defrost heater 129. For a brief period, refrigeration is prevented and the defrost heater heats the evaporator 64 quickly to melt the frost therefrom. Refrigerant vapor is formed within the evaporator 64 and heated sufficiently that it rises and at the same time defrosts the plate evaporator 32. At the termination of the defrost period, the clock 137 returns the switch 139 into connection with the sealed unit 123 so that whenever the switch 121 is closed it will be connected across the supply conductors L1 and L2.

The fans 42 and 76 may be connected to the double throw switch 141 permitting them to be either connected to one of the contacts of the double throw switch 139 so that they will be shut off during defrosting periods or provided with direct connection to the supply conductor L2 so that they will continue to operate during the defrost period. The fans 42 and 76 may be connected in parallel with each other and in series with the door switches 143 and 145 operated respectively by the doors 26 and 88 to the closed position when the doors are closed and to open position when the doors are open. Another switch 147 may be manually operated and connected in shunt with the door switches 143 and 145 so that the fans will operate whether the doors are opened or closed.

The switches 143 to 147 may be connected to the double throw switch 149 providing a connection either through the switch 121 to the line L1 so that the fans will cycle with the motor compressor unit 123 or direct to the supply conductor L1 so that they will operate regardless of whether the switch 121 is open or closed. The sealed motor compressor unit 123 is located in the machine compartment 151 beneath the evaporator pan 54 and discharges into a condenser 153 which may be located either in the machine compartment 151 or at the back of the refrigerator outside the insulated walls. The condenser discharges through a capillatory tube 155 into the inlet of the evaporator 64. The drain pan 62 is provided with an extension 157 at the right to provide a convenient way for the passage of the supply and discharge conduits to and from the evaporator 64.

This system keeps the freezing compartment 60 substantially free of frost at all times and keeps the compartment 24 at a desirable temperature and humidity to best fit the multitude of refrigerating requirements of the compartment 24. The frost upon the evaporators 32 and 64 is removed daily so that its thickness is kept at a minimum. The refrigerator can be assembled and disassembled readily and the false bottom wall 66 of the freezing compartment provides rapid freezing and easy access to the fan 70.

While the form of embodiment of the invention as herein disclosed constitutes a preferred form, it is to be understood that other forms might be adopted, as may come within the scope of the claims which follow.

What is claimed is as follows:

1. A household refrigerator including an insulated cabinet containing generally box-shaped food compartment and freezing compartment liners, the bottom of said freezing compartment liner being formed into a drain pan provided with a drain outlet, a horizontal refrigerant evaporator supported by said drain pan, said freezing compartment being provided with a removable horizontal false bottom having extensive horizontal portions in contact with and resting upon said horizontal evaporator, means for drawing air from said freezing compartment and passing the air between said false bottom and said drain pan in heat transfer with said evaporator and circulating the air outside the freezing compartment and thence returning the air to the freezing compartment, and means for cooling the interior of said food compartment liner.

2. A household refrigerator including an insulated cabinet containing generally box-shaped food compartment and freezing compartment liners, the bottom of said freezing compartment liner being formed into a drain pan provided with a drain outlet, a refrigerant evaporator supported by said drain pan, said freezing compartment being provided with a false sheet metal bottom resting upon said evaporator, means for drawing air from said freezing compartment and passing the air between said false bottom and said drain pan in heat transfer with said evaporator and thence returning the air to the freezing compartment, means for cooling the interior of said food compartment liner, said evaporator being of a generally rectangular shape having conduit connections adjacent the front and rear of one side, and conduits extending from said connections across the rear of the drain pan providing torsional flexibility to allow the front of the evaporator to be lifted without damaging the conduits.

3. A household refrigerator including an insulated cabinet containing a generally box-shaped liner enclosing a freezing compartment, the bottom of said liner being in the form of a drain pan having a drain outlet, a vertical wall of said liner being provided with an opening therein, a fan for drawing air through said opening, an evaporator located above said drain pan, a removable false sheet metal bottom extending over and in contact with said evaporator, upwardly extending shroud extending up to and covering said opening in said vertical wall, means for conducting air discharged by said fan over the outer face of a portion of said liner and then discharging the air into the interior of said liner, and means for conducting air from the interior of said liner to the space between said false bottom and the drain pan on the opposite side of the evaporator from said shroud.

4. A household refrigerator including an insulated cabinet containing a generally box-shaped liner enclosing a freezing compartment, the bottom of said liner being in the form of a drain pan having a drain outlet, a vertical wall of said liner being provided with an opening therein, a fan for drawing air through said opening, an evaporator located above said drain pan, a removable false sheet metal bottom extending over and in contact with said evaporator within said liner, a discharge shroud for said fan extending on the outside of said vertical wall, said vertical wall having discharge openings therein within and communicating with said shroud for discharging air into the interior of said liner, means for conducting air from one side of the evaporator between said false bottom and said drain pan to said opening in said vertical wall, and means for conducting air from the interior of said liner to the space between said false bottom and said drain pan on the opposite side of said evaporator.

5. A household refrigerator including an insulated cabinet having insulated walls enclosing a freezing compartment, a drain pan at the bottom of said freezing compartment, a generally horizontal evaporator having upright fins located above said drain pan, a defrost heater supported upon and contacting said drain pan and extending beneath and supporting said evaporator for defrosting both the drain pan and the evaporator, said fins having notches on their bottom edges receiving and fitting said heater to provide direct heat conduction therebetween, said compartment being provided with a false bottom wall having extensive horizontal areas supported upon and contacting the upright fins of said evaporator to provide direct heat conduction therebetween, and means for circulating air between said drain pan and said false bottom wall through said evaporator and through said compartment.

6. A household refrigerator including an insulated cabinet having insulated walls enclosing a freezing compartment, a drain pan at the bottom of said freezing compartment, a generally horizontal evaporator having upright fins located above said drain pan, a defrost heater supported upon and contacting said drain pan and extending beneath and supporting said evaporator for defrosting both the drain pan and the evaporator, said fins having notches on their bottom edges receiving and fitting said heater to provide direct heat conduction therebetween, said heater being slightly larger than said notches for holding said evaporator and pan in spaced relation, said compartment being provided with a false bottom wall having extensive horizontal areas supported upon and contacting the upright fins of said evaporator to provide direct heat conduction therebetween, and means for circulating air between said drain pan and said false bottom wall through said evaporator and through said compartment, said drain pan being provided with a system of drain grooves for draining defrost water melted from the evaporator by said heater.

7. A household refrigerator including an insulated cabinet containing a generally box-shaped liner enclosing a freezing compartment, the bottom of said liner being in the form of a drain pan having a drain outlet, a vertical wall of said liner being provided with an opening therein, a fan for drawing air through said opening, an evaporator located above said drain pan, a false sheet metal bottom extending over and in contact with said evaporator, said vertical wall being provided with an upwardly facing laterally extending notch above said opening, an upwardly extending shroud extending up to and covering said opening in said vertical wall, said shroud having a downwardly extending flange extending and fitting into said upwardly facing notch to provide a connection between said shroud and said wall, means for conducting air discharged by said fan into the interior of said liner, and means for conducting air from the interior of said liner to the space between said false bottom and the drain pan.

8. A household refrigerator including an insulated cabinet containing a generally box-shaped food compartment and freezing compartment liners, the bottom of said freezing compartment liner being formed into a drain pan provided with a drain outlet, a horizontal refrigerant evaporator above said drain pan, a defrost heater supported upon and contacting said drain pan and extending beneath and supporting said evaporator and holding said evaporator and drain pan in spaced relationship for minimizing heat conduction between the pan and the evaporator during refrigeration periods and for heating both the drain pan and the evaporator during defrosting periods, said freezing compartment being provided with a removable horizontal false bottom having extensive horizontal portions in contact with and resting upon said horizontal evaporator, means for drawing air from said freezing compartment and passing the air between said false bottom and said drain pan in heat transfer with said evaporator and thence returning the air to the freezing compartment, and means for cooling the interior of said food compartment liner.

References Cited in the file of this patent

UNITED STATES PATENTS

| | | |
|---|---|---|
| 2,167,442 | Alsing | July 25, 1939 |
| 2,458,048 | Bauman | Jan. 4, 1949 |
| 2,481,616 | Richard | Sept. 13, 1949 |
| 2,510,758 | Rundell | June 6, 1950 |
| 2,592,233 | Atchison | Apr. 8, 1952 |
| 2,670,611 | Fagerberg | Mar. 2, 1954 |
| 2,692,482 | Shoemaker | Oct. 26, 1954 |
| 2,767,558 | Wallenbrock | Oct. 23, 1956 |
| 2,792,691 | Murphy et al. | May 21, 1957 |
| 2,801,525 | Bixler | Aug. 6, 1957 |